United States Patent [19]

Catterson

[11] 4,233,043

[45] Nov. 11, 1980

[54] AIR CLEANER FOR INTERNAL COMBUSTION ENGINE

[75] Inventor: Robert K. Catterson, Brookfield, Wis.

[73] Assignee: Briggs & Stratton Corporation, Wauwatosa, Wis.

[21] Appl. No.: 938,039

[22] Filed: Aug. 30, 1978

[51] Int. Cl.[3] .......... B01D 50/00

[52] U.S. Cl. .......... 55/315; 55/385 B; 55/434; 55/437; 55/473; 55/498; 55/510; 55/DIG. 28; 123/198 E; 180/54 A

[58] Field of Search .......... 55/315, 318, 385 B, 55/385 R, 467, 473, 498, 510, DIG. 28, 434, 437; 123/198 E, 198 D; 180/54 R, 54 A

[56] References Cited

U.S. PATENT DOCUMENTS

| | | | |
|---|---|---|---|
| 2,069,379 | 2/1937 | Moe | 55/DIG. 28 X |
| 2,708,920 | 5/1955 | Pasturczak | 55/385 B X |
| 2,963,111 | 12/1960 | Rohrbacher | 55/498 X |
| 3,488,928 | 1/1970 | Tarala | 55/498 X |
| 3,885,547 | 5/1975 | Doepke et al. | 123/198 D |
| 4,117,823 | 10/1978 | Funabashi et al. | 123/198 E |

FOREIGN PATENT DOCUMENTS

| | | | |
|---|---|---|---|
| 650432 | 10/1962 | Canada | 55/510 |

*Primary Examiner*—Kathleen J. Prunner

[57] ABSTRACT

An air cleaner especially for use on small single cylinder internal combustion engines has a substantially annular air filter element of the dry paper type, removably mounted in a housing to divide the same into inner and outer compartments, the latter having an outlet for cleaned air that is connectable with the air intake port of the engine carburetor. An inlet passage for air to be cleaned which leads to the inner compartment, is so constructed that air flowing therethrough must undergo an abrupt change in direction in order to reach the inner compartment, and has an outlet so located that solid contaminants entrained in the air flowing to the inner compartment, by virtue of the tendency thereof to continue moving in the direction they were, leave the inlet passage through that outlet and hence are separated from the air before it enters the inner compartment. The entrance into the air inlet passage communicates with the high velocity region of the blower housing of the engine and is so disposed with respect thereto that to enter the inlet passage, air from the blower housing must abruptly change direction so that much of any dust and chaff entrained in the air stream bypasses the entrance.

1 Claim, 6 Drawing Figures

AIR CLEANER FOR INTERNAL COMBUSTION ENGINE

This invention relates to air cleaners for internal combustion engines, and particularly engines of the single cylinder type that are extensively used to power lawn mowers and similar equipment.

It is well known that unless the air that enters the carburetor of an internal combustion engine is cleaned of dirt and dust, those contaminants will be drawn into the engine and become a part of the oil film between the moving engine parts. When that happens an abrasive mixture is formed that is very damaging to the engine. A reliable and effective air cleaner is therefore an indispensible adjunct of every internal combustion engine.

Air cleaners for internal combustion engines heretofore available have been of several types. For automobile engines they customarily employ a filter element or cartridge in the form of an annulus of corrugated air-pervious filter paper. Small single cylinder engines usually have been equipped with urethane foam-type air filters like that of the Lechtenberg U.S. Pat. No. 2,999,562, generally referred to as oil foam air cleaners.

The effectiveness of all air cleaners obviously depends upon the state of cleanliness of its filtering element, which means that to insure good reliable performance, the filtering element must be periodically removed from its housing and cleaned. In the case of the urethane foam type air cleaner, the filter element had to be washed in kerosene or liquid detergent and water. The frequency with which that rather messy task must be undertaken depends upon the environment in which the engine operates. In dry, dusty locations it can, and has, become a nuisance, with the result that replacement of the urethane foam element with a dry paper-type cartridge would be desirable, especially if its inability to hold as much dirt as an oil foam element could be offset and the substitution could be made without entailing any change in the external dimensions and shape of the existing air cleaner.

This invention accomplishes that desirable result by the incorporation in the air cleaner of means to rid the air of a significant proportion of any dirt, chaff or other solid contaminants before the air reaches the filter element.

More specifically, this invention achieves that result by forcing all of the air that enters the air cleaner to undergo abrupt changes in direction before it reaches the filter element, and by providing the inlet passage through which the air flows to the filter element with outlet means so located with respect to the means that forces those abrupt changes in direction that, because of their inertia and the consequent tendency to continue in the direction they were moving, solid contaminants in the air are separated therefrom by passing through the outlet means instead of following the changed direction of the air moving towards the filter element.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which.

Figure 1:
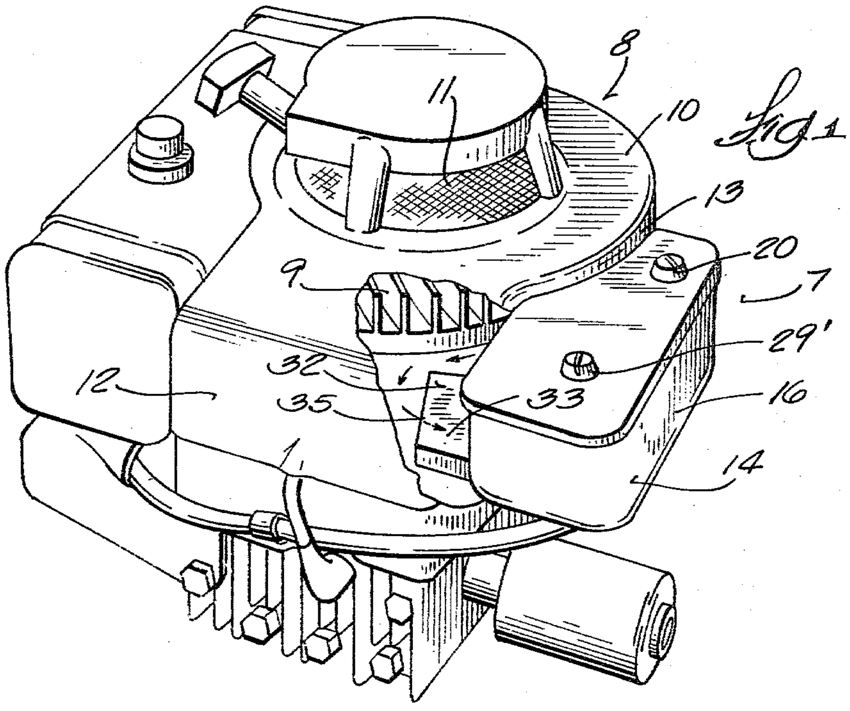
FIG. 1 is a perspective view of a single cylinder vertical shaft air-cooled internal combustion engine equipped with the air cleaner of this invention, and with part of its blower housing cut away.
Figure 2:
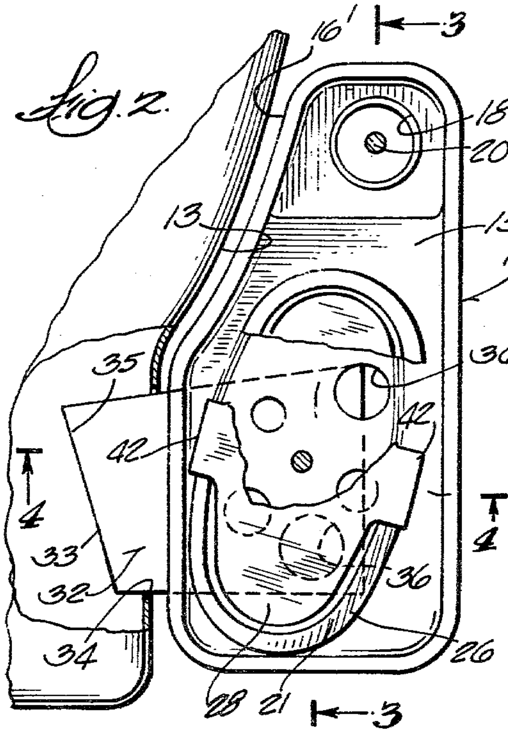
FIG. 2 is a top view of the air cleaner and the adjacent portion of the blower housing, with portions thereof broken away.
Figure 4:
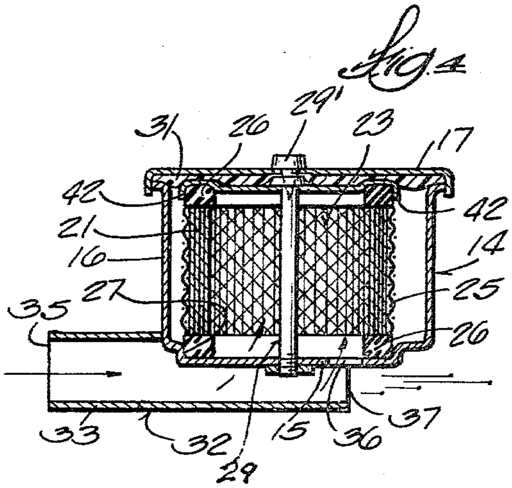
FIG. 4 is also a sectional view through FIG. 2 but on the plane of the line 4—4.
Figure 3:
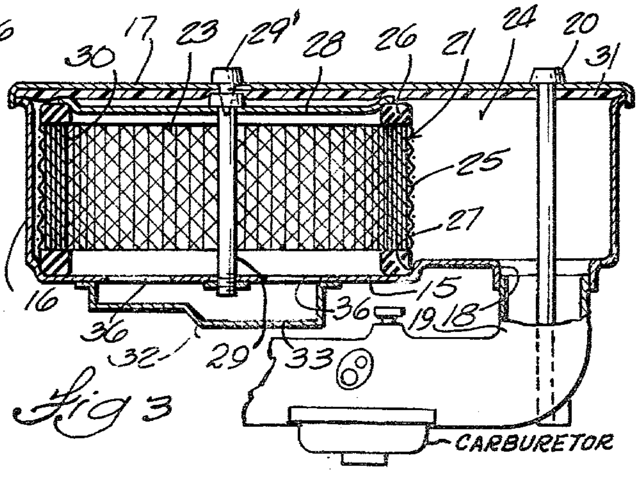
FIG. 3 is a sectional view through FIG. 2 on the plane of the line 3—3.

Referring to the drawings, the numeral 7 identifies the air cleaner of a conventional air cooled vertical shaft internal combustion engine indicated generally by the numeral 8. As is customary in such engines, its combined flywheel and blower fan 9 is covered by a blower housing 10. The fan draws cooling air into the housing through a screened inlet 11 and directs that air over the hot surfaces of the engine. For that purpose, the housing has a downwardly opening end portion 12 through which the air flows at relatively high velocity.

The end portion 12 of the blower housing projects from the cylindrical part thereof that surrounds the fan and flywheel, in such a way that it forms a pocket in which the air cleaner 7 is nested in laterally adjacent relationship to the side wall 13 of the blower housing. This neat and very practical positional relationship between the air cleaner and the blower housing which has existed for several years is not disturbed by the present invention, despite the fact that it provides an air cleaner that is far more efficient than its predecessor.

Moreover, the size and external configuration of the air cleaner of this invention, and also much of its general structure, is the same as that of its predecessor. Hence, the body of the air cleaner is an open-topped stamped sheet metal shell 14 of generally horizontally elongated form with a flat bottom wall 15 and a continuous side wall 16 rising from the perimeter of the bottom wall. A cover 17 closes the top of the shell. By virtue of its snug fit against the side of the blower housing, the adjacent portion 16' of the side wall of the shell is shaped to be contiguous to the adjacent part of the blower housing side wall 13. As will be explained, this contiguity between the side walls of the blower housing and the shell 14 plays a part in the attainment of the objectives of this invention.

At one end of the shell 14 its bottom wall 15 has a hole 18 which forms the clean air outlet of the air cleaner and which opens into the air intake 19 of the carburetor when the air cleaner is mounted on the engine. The air cleaner is detachably held in place by a screw 20 that passes through a hole in its cover 17 and screws into a socket formed in the body of the carburetor.

As with all air cleaners for internal combustion engines, engine suction draws the air to be cleaned through a filter element 21, but with this invention a very significant proportion of the dirt and solid contaminants entrained in the air that is drawn into the air cleaner is separated from the air before it reaches the filter element. As a result, the filter element retains its effectiveness for a much longer time than could be expected in the past. That advantage makes it practicable to use a dry paper-type filter element or cartridge in lieu of the previously used urethane foam filter element—as in the Lechtenberg Pat. No. 2,999,562, which—because of the messiness of the job—only too often was not properly serviced, with the result that the carburetor would be starved for air due to the filter element becoming clogged with dirt.

Figure 5:
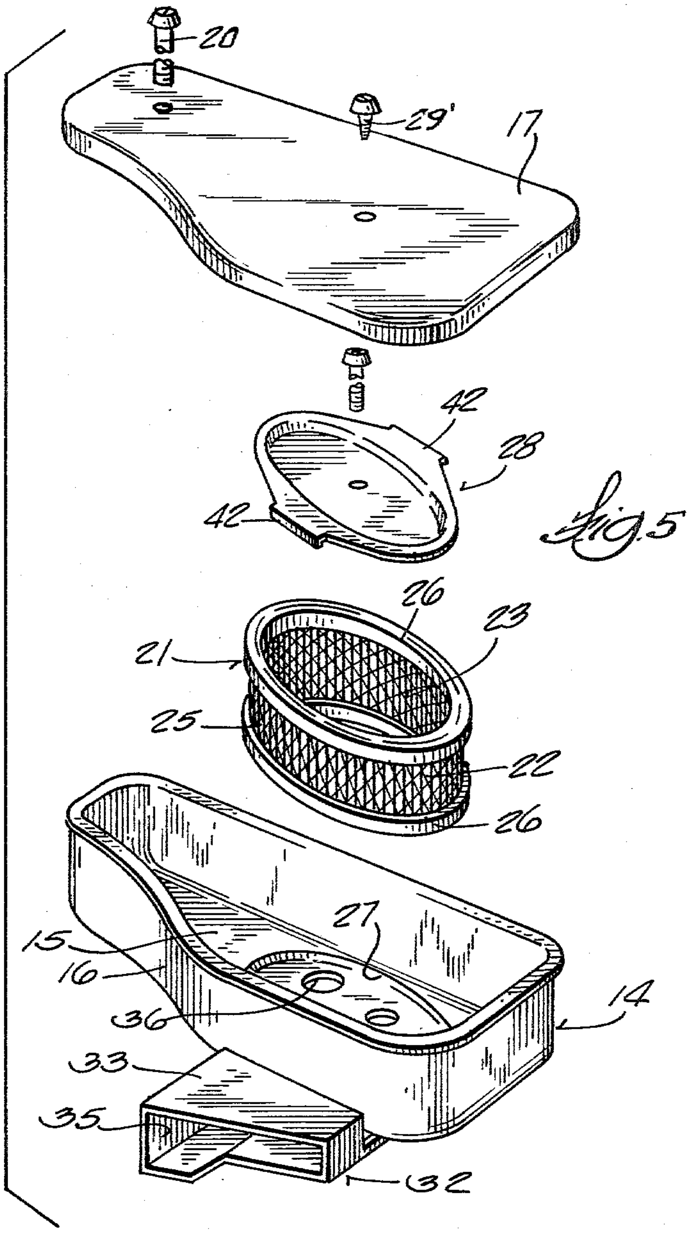
FIG. 5 is an exploded perspective view of the component parts of the air cleaner.

As best illustrated in FIG. 5, the filter element or cartridge 21 comprises an endless corrugated air-pervious paper wall 22 that divides the interior of the air cleaner into an inlet compartment 23 and an outlet compartment 24, the latter being communicated with the carburetor through the hole 18 in the bottom wall 15 of the shell 14. Except that the shape of the wall 22 is eliptical, rather than cylindrical, it could be considered annular. The eliptical shape was chosen to obtain as much surface area as possible without necessitating a change in the size and shape of the air cleaner, which—as explained—has been left the same as that of its predecessor.

In any event, the opposite edges of the wall 22 and of a wire mesh reinforcing screen 25 that surrounds it, are embedded in rims 26 that are formed of rubber or rubber-like material. Upon insertion of the filter element or cartridge into the shell 14, its lower rim 26 fits into a shallow depression 27 in the bottom wall of the shell and is thereby held against lateral displacement.

An internal cover 28 is seated on the upper rim 26 and drawn tightly against that rim by a removable retaining member in the form of a long bolt 29 that has its head bearing against the top of the cover 28 and its lower threaded end screwed into a tapped hole in the bottom wall 15 of the shell. Accordingly the inner cover 28 and the bottom wall of the shell coact with the inner surface 30 of the air-pervious wall 22 to define the inner compartment 23, the outer compartment 24 being the space within the shell 14 surrounding the filter element or cartridge.

To assure against entry of unfiltered air into the outer compartment, the underside of the cover 17—or at least the marginal portion thereof, has a sealing gasket 31 adhered thereto to be clamped between the cover and the upper edge of the shell upon tightening of a screw 29' that passes through the cover 17 and is threaded into a tapped socket in the head of the bolt 29. The screw 20 which holds the air cleaner in place on the carburetor coacts with the screw 29' to draw the cover 17 down onto the upper edge of the shell.

The air to be filtered is drawn from the blower housing into the inner compartment through a novel inlet passage 32. This passage is defined by an open-ended duct 33 that extends transversely across the underside of the bottom wall 15 of the shell and laterally beyond its side wall portion 16' far enough to project through a hole 34 in the adjacent side wall 13 of the blower housing. The open end 35 of this projecting end portion of the duct which provides the entrance into the inlet passage is located well within the high velocity air stream flowing through the blower housing and is so disposed that for air to enter the duct it must undergo an abrupt change in direction. As a result, a significant proportion of any dirt or other solid contaminants entrained in the air flowing through the blower housing bypasses the entrance into the duct.

While that is a step in the right direction, it is not sufficient to achieve the objective of this invention since dirt and solid contaminants that do not bypass the entry into the duct, would reach the inner compartment 23 unless some means were provided to prevent that from happening. That objective is achieved by forcing the air to undergo a second abrupt turn or change in direction before it reaches the inner compartment and by providing an outlet from the duct for the dirt and solid contaminants that do not make this second abrupt turn. This second hurdle results from the fact that the duct 33 is directly adjacent to the underside of the shell 14 so that the two have a common wall and that the only communication between the duct and the inner compartment 23 is through holes 36 in that common wall.

Although the suction manifested at these holes is substantial, much of the dirt and solid contaminants that may be entrained in the air drawn into the duct 33 will continue past the holes 36 to leave the duct through an outlet provided by the open downstream end 37 of the duct.

By virtue of the aforesaid hurdles the amount of dirt that is trapped on the air receiving surface of the filter element or cartridge is considerably less per unit of time than in prior air cleaners. Nevertheless some build up does occur. As it does, engine suction manifested in the outer compartment 24 increasingly tends to draw the opposite side walls of the filter element or cartridge outwardly and away from proper engagement with the inner cover 28. To prevent that objectional consequence, the inner cover has downwardly projecting ears 42 that engage the upper rim 26 of the filter element or cartridge and prevent outward displacement thereof. At the bottom of the cartridge its reception in the shallow depression 27 serves the same function.

To illustrate the improvement achieved by this invention, in a test conducted in a dry, dusty atmosphere, the heretofore standard urethane foam element which this invention has replaced, plugged up in eight hours. The dry paper-like filter element of this invention had no chaff on its inside surface, i.e., the dirty side of the element, and engine performance was still normal even after being subjected to the same dry dusty conditions for one-hundred and fifteen hours.

Figure 6:
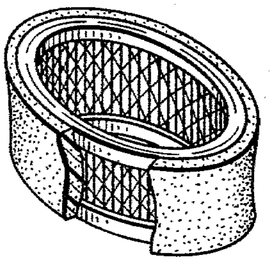
FIG. 6 is a perspective view of an air filter element or cartridge that could be used to advantage in the air cleaner of this invention, in lieu of the one shown in FIGS. 3-5.

While this invention is especially significant from the standpoint of its having made it feasible to use a dry paper-type filter element or cartridge, the infrequent cleaning of which is by no means as messy a task as cleaning a foam type filter element, it should be obvious that the invention also improves the effectiveness of air cleaners that use foam type elements, and elements that consist of a dry corrugated paper filter element encircled by a foam sleeve like the one illustrated in FIG. 6.

Those skilled in the art will appreciate that the invention can be embodied in forms other than as herein disclosed for purposes of illustration.

The invention is defined by the following claims:

I claim:

1. In combination with (a) an internal combustion engine having a blower housing through which cooling air is circulated by a blower, (b) a carburetor and an air intake leading thereto, and (c) an air filter element enclosed in a filter housing to filter air flowing between an air intake to the housing and an air outlet from the housing that is connectible to the air intake leading to the carburetor, the improvement comprising:

(1) a straight air duct having opposed open ends, one of the open ends comprising an entrance to the duct and the other an exit from the duct, the entrance of the air duct being positioned within the blower housing to receive air circulated by the blower and direct the air with an abrupt change in direction to flow towards the exit of the duct, (2) the air intake to the filter housing communicating at an angle with the air duct so that air entering the filter housing undergoes a second abrupt change of direction and much of any particulate contaminants entrained in the air flowing through the duct leave through the exit end of the duct, (3) the filter housing having bottom and side walls and a removable cover, (4) the air filter element being in the form of an endless air pervious wall having inner and outer surfaces and having top and bottom edges, the latter of which is seated on the bottom wall of the filter housing and the filter element dividing the filter housing into inner and outer compartments, (5) the air intake to the filter housing leading to said inner compartment, (6) guide means on the inner surface of the bottom wall of the filter housing snugly fitting the bottom edge of the filter element to minimize the possibility of leakage of air from the inner compartment to the outer compartment and to also hold the bottom edge of the filter element against displacement from its intended shape by suction within said outer compartment, (7) an internal cover snugly fitted to the top edge of the air filter element, and a removable retaining member drawing said internal cover down onto the top edge of the filter element, and (8) shape retaining means on said internal cover engaged over opposite portions of the top edge of the filter element to coact with said guide means on the inner surface of the bottom wall of the shell in holding the filter element against displacement from its intended shape.

* * * * *